(12) United States Patent
Davis et al.

(10) Patent No.: US 10,359,888 B2
(45) Date of Patent: *Jul. 23, 2019

(54) PROJECTED, INTERACTIVE ENVIRONMENT

(71) Applicant: MEP Tech, Inc., Salt Lake City, UT (US)

(72) Inventors: Mark L. Davis, West Jordan, UT (US); Timothy Alan Tabor, West Jordan, UT (US); Roger H. Hoole, Salt Lake City, UT (US); Jeffrey Taylor, Naperville, UT (US); John M. Black, West Jordan, UT (US)

(73) Assignee: MEP Tech, Inc., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/980,638

(22) Filed: May 15, 2018

(65) Prior Publication Data

US 2018/0260078 A1 Sep. 13, 2018

Related U.S. Application Data

(63) Continuation of application No. 15/414,617, filed on Jan. 24, 2017, now Pat. No. 9,971,458, which is a
(Continued)

(51) Int. Cl.
*G06F 3/042* (2006.01)
*G06F 3/01* (2006.01)
(Continued)

(52) U.S. Cl.
CPC .......... *G06F 3/0425* (2013.01); *A63F 9/0468* (2013.01); *A63F 13/10* (2013.01);
(Continued)

(58) Field of Classification Search
CPC ............... G06F 3/0425; G06F 3/04883; G06F 3/04815; G06F 3/017; G06F 3/011;
(Continued)

(56) References Cited

U.S. PATENT DOCUMENTS 5,844,985 A 12/1998 Kulberg et al.
5,853,327 A 12/1998 Gilboa
(Continued)

FOREIGN PATENT DOCUMENTS

| EP | 1827630 B1 | 5/2008 |
| WO | 2007107874 A2 | 9/2007 |
| WO | 2009149112 A1 | 12/2009 |

OTHER PUBLICATIONS

Bimber, O., et al., "Enabling View-Dependent Stereoscopic Projection in Real Environments," IEEE, Proceedings of the International Symposium on Mixed and Augmented Reality (ISMAR '05) (Oct. 5-8, 2005).
(Continued)

*Primary Examiner* — John P. Dulka
(74) *Attorney, Agent, or Firm* — Durham Jones & Pinegar, P.C., Intellectual Property Law Group

(57) ABSTRACT

An interactive environment image may be projected onto one or more surfaces, and interaction with the projected environment image may be detected within a three-dimensional space over the one or more surfaces. The interactive environment image may be a three dimensional image, or it may be two dimensional. An image is projected onto a surface to provide a visual representation of a virtual space including one or more of the virtual objects, which may be spatially positioned. User interaction with the projected visualized representation of the virtual space may be detected and, in response to user interaction, the projected visualized representation may be changed.

20 Claims, 9 Drawing Sheets

Related U.S. Application Data continuation-in-part of application No. 14/462,750, filed on Aug. 19, 2014, now Pat. No. 9,550,124, which is a continuation of application No. 13/547,626, filed on Jul. 12, 2012, now Pat. No. 8,808,089, which is a continuation-in-part of application No. 12/855,604, filed on Aug. 12, 2010, now abandoned, which is a continuation-in-part of application No. 12/651,947, filed on Jan. 4, 2010, now abandoned, which is a continuation-in-part of application No. 12/411,289, filed on Mar. 25, 2009, now abandoned.

(51) Int. Cl.

| | |
|---|---|
| A63F 13/213 | (2014.01) |
| A63F 13/40 | (2014.01) |
| A63F 9/04 | (2006.01) |
| G06F 3/0481 | (2013.01) |
| G06F 3/0488 | (2013.01) |
| A63F 13/65 | (2014.01) |
| A63F 13/52 | (2014.01) |
| A63F 13/42 | (2014.01) |
| A63F 1/00 | (2006.01) |
| A63F 9/24 | (2006.01) |

(52) U.S. Cl.
CPC .......... *A63F 13/213* (2014.09); *A63F 13/40* (2014.09); *A63F 13/42* (2014.09); *A63F 13/52* (2014.09); *A63F 13/65* (2014.09); *G06F 3/011* (2013.01); *G06F 3/017* (2013.01); *G06F 3/04815* (2013.01); *G06F 3/04883* (2013.01); *A63F 1/00* (2013.01); *A63F 9/04* (2013.01); *A63F 2001/008* (2013.01); *A63F 2009/2425* (2013.01); *A63F 2009/2463* (2013.01); *A63F 2250/30* (2013.01); *A63F 2300/1087* (2013.01); *A63F 2300/6045* (2013.01); *A63F 2300/66* (2013.01); *A63F 2300/69* (2013.01); *G06F 2203/04808* (2013.01)

(58) Field of Classification Search
CPC .......... A63F 13/42; A63F 13/52; A63F 13/65; A63F 9/0468; A63F 13/213; A63F 13/40
See application file for complete search history.

(56) References Cited

U.S. PATENT DOCUMENTS

| | | | |
|---|---|---|---|
| 6,281,878 | B1 | 8/2001 | Montellese |
| 6,331,145 | B1 | 12/2001 | Sity et al. |
| 6,611,252 | B1 | 8/2003 | DuFaux |
| 6,614,422 | B1 | 9/2003 | Rafii et al. |
| 6,650,318 | B1 | 11/2003 | Arnon |
| 6,710,770 | B2 | 3/2004 | Tomasi et al. |
| 6,750,849 | B2 | 6/2004 | Potkonen |
| 6,798,401 | B2 | 9/2004 | DuFaux |
| 6,832,954 | B2 | 12/2004 | Odake et al. |
| 6,955,297 | B2 | 10/2005 | Grant |
| 7,095,033 | B2 | 8/2006 | Sorge |
| 7,204,428 | B2 | 4/2007 | Wilson |
| 7,753,798 | B2 | 7/2010 | Soltys et al. |
| 8,485,907 | B2 | 7/2013 | Soltys et al. |
| 8,808,089 | B2 | 8/2014 | Davis et al. |
| 9,550,124 | B2 * | 1/2017 | Davis .................. A63F 9/0468 |
| 9,971,458 | B2 * | 5/2018 | Davis .................. G06F 3/0425 |
| 2004/0102247 | A1 | 5/2004 | Smoot et al. |
| 2004/0160000 | A1 | 8/2004 | Lindsey et al. |
| 2005/0245302 | A1 | 11/2005 | Bathiche et al. |
| 2006/0050243 | A1 | 3/2006 | Kluewel |
| 2006/0073869 | A1 | 4/2006 | LeMay et al. |
| 2006/0073892 | A1 | 4/2006 | Watanabe et al. |
| 2006/0052885 | A1 | 9/2006 | Kong |
| 2006/0274972 | A1 | 12/2006 | Peterson |
| 2007/0046625 | A1 | 3/2007 | Yee |
| 2007/0178955 | A1 | 8/2007 | Mills |
| 2007/0201863 | A1 | 8/2007 | Wilson et al. |
| 2008/0032808 | A1 | 2/2008 | Ochi |
| 2008/0122805 | A1 | 5/2008 | Smith et al. |
| 2008/0278894 | A1 | 11/2008 | Chen et al. |
| 2008/0280682 | A1 | 11/2008 | Brunner et al. |
| 2008/0318550 | A1 | 12/2008 | DeAtley |
| 2009/0020947 | A1 | 1/2009 | Albers |
| 2009/0029754 | A1 | 1/2009 | Slocum et al. |
| 2009/0104976 | A1 | 4/2009 | Ouwerkerk et al. |
| 2009/0124382 | A1 | 5/2009 | Lachance et al. |
| 2009/0168027 | A1 | 7/2009 | Dunn et al. |
| 2009/0185139 | A1 | 7/2009 | Morikuni |
| 2009/0264196 | A1 | 10/2009 | Fujimoto |
| 2009/0323029 | A1 | 12/2009 | Chen et al. |
| 2010/0020026 | A1 | 1/2010 | Benko et al. |
| 2010/0035684 | A1 | 2/2010 | Kotlarik et al. |
| 2010/0113148 | A1 | 5/2010 | Haltovsky et al. |
| 2010/0182402 | A1 | 7/2010 | Nakajima et al. |
| 2010/0241976 | A1 | 9/2010 | Nozaki et al. |
| 2010/0248839 | A1 | 9/2010 | Davis et al. |
| 2010/0279768 | A1 | 11/2010 | Huang et al. |
| 2010/0285881 | A1 | 11/2010 | Bilow |
| 2011/0007140 | A1 | 1/2011 | Nakahata et al. |
| 2011/0133934 | A1 | 6/2011 | Tan et al. |
| 2011/0165923 | A1 | 7/2011 | Davis et al. |
| 2011/0181553 | A1 | 7/2011 | Brown et al. |
| 2011/0256927 | A1 | 10/2011 | Davis et al. |
| 2011/0288964 | A1 | 11/2011 | Linder et al. |
| 2012/0026376 | A1 | 2/2012 | Goran |
| 2012/0223885 | A1 | 9/2012 | Perez |
| 2012/0280941 | A1 | 11/2012 | Hu |
| 2013/0113975 | A1 | 5/2013 | Gabris |
| 2014/0043516 | A1 | 2/2014 | Baker |

OTHER PUBLICATIONS

Froehlich, B., et al, "Implementing Multi-Viewer Time-Sequential Stereo Displays Based on Shuttered LCD Projectors," Union Agency, WSCG 2005: Full Papers: The 13-th International Conference in Central Europe on Computer Graphics, Visualization and Computer Vision 2005, pp. 139-146 (Jan. 31-Feb. 4, 2005).

Hanlon, M., "Philips Enterable-Electronic Multi-Touch Tabletop Gaming Platform," http://www.gizmag.com/go/6093/ (Sep. 4, 2006).

Harrison, C., et al., "OmniTouch: Wearable Multitouch Interaction Everywhere," ACM, UIST '11 Proceedings of the 24th Annual ACM Symposium on User Interface Software and Technology, pp. 441-450 (Oct. 19, 2011).

Krotosky, S.J., et al., "A Comparison of Color and Infrared Stereo Approaches to Pedestrian Detection," Proceedings of the 2007 IEEE Intelligent Vehicles Symposium, pp. 81-86 (Jun. 13-15, 2007).

Kulik, A., et al., "C1x6: A Stereoscopic Six-User Display for Co-located Collaboration in Shared Virtual Environments" ACM Transactions on Graphics, vol. 30, No. 6, Article 188 (Dec. 2011).

Pinhanez, C., "The Everywhere Displays Projector: A Device to Create Ubiquitous Graphical Interfaces," Springer-Verlag, Ubicomp 2001: Ubiquitous Computing, pp. 315-331 (2001).

Raskar, R., et al., "iLamps: Geometrically Aware and Self-Configuring Projectors," ACM SIGGRAPH 2003 Conference Proceedings (2003).

Raskar, R., et al., "The Office of the Future: A Unified Approach to Image-Based Modeling and Spatially Immersive Displays," ACM Proceedings of the 25th Annual Conference on Computer Graphics and Interactive Techniques, pp. 179-188 (Jul. 19-24, 1998).

Staud, P., et al., "Palmap: Designing the Future of Maps," ACM, OZCHI '09 Proceedings of the 21st Annual Conference of the Australian Computer-Human Interaction Special Interest Group: Design: Open 24/7, pp. 427-428 (Nov. 23-27, 2009).

Wilson, A.D., et al., "Combining Multiple Depth Cameras and Projectors for Interactions On, Above, and Between Surfaces," Proceedings of the 23rd Annual ACM Symposium on User Interface Software and Technology, pp. 273-282 (Oct. 6, 2010).

Wilson, A.D., "PlayAnywhere: A Compact Interactive Tabletop Projection-Vision System," UIST '05 Proceedings of the 18th

(56) References Cited

OTHER PUBLICATIONS

Annual ACM Symposium on User interface Software and Technology, pp. 83-92 (2005).

* cited by examiner

PROJECTED, INTERACTIVE ENVIRONMENT

CROSS REFERENCE TO RELATED APPLICATIONS

This application is a continuation of U.S. patent application Ser. No. 15/414,617, filed on Jan. 24, 2017, now U.S. Pat. No. 9,971,458, issued May 15, 2018, titled PROJECTION OF INTERACTIVE ENVIRONMENT ("the '617 Application"), which is a continuation-in-part of U.S. patent application Ser. No. 14/462,750, filed on Aug. 19, 2014, now U.S. Pat. No. 9,550,124, issued Jan. 24, 2017, titled PROJECTION OF INTERACTIVE ENVIRONMENT ("the '750 Application"). The '750 Application is a continuation of U.S. patent application Ser. No. 13/547,626, filed on Jul. 12, 2012, now U.S. Pat. No. 8,808,089, issued Aug. 19, 2014, titled PROJECTION OF INTERACTIVE GAME ENVIRONMENT ("the '626 Application"). The '626 Application is a continuation-in-part of U.S. patent application Ser. No. 12/855,604, filed Aug. 12, 2010, titled PROJECTION OF INTERACTIVE GAME ENVIRONMENT, abandoned ("the '604 Application"). The '604 Application is a continuation-in-part of U.S. patent application Ser. No. 12/651,947, filed Jan. 4, 2010, titled ELECTRONIC CIRCLE GAME SYSTEM, abandoned ("the '947 Application"). The '947 Application is a continuation-in-part of U.S. patent application Ser. No. 12/411,289, filed Mar. 25, 2009, titled WIRELESSLY DISTRIBUTED ELECTRONIC CIRCLE GAMING, abandoned ("the '289 Application").

The entire disclosures of the '617 Application, the '750 Application, the '626 Application, the '604 Application, the '947 Application, and the '289 Application are, by this reference, incorporated herein.

SUMMARY

Embodiments described herein relate to the projection of an image and to interaction with the projected image. The image may be a two-dimensional image, or it may be three-dimensional. Data is received that represents virtual objects that are spatially positioned in virtual environment space. An image is then projected to display a visual representation of all or a portion of the virtual environment space, including one or more of the virtual objects within the virtual environment space. The system may then detect user interaction with the locations of one or more of the virtual objects in the virtual environment space, as seen in the visual representation of the virtual environment space displayed by the image that has been projected and, in response thereto, change the image that is projected. That interaction may be via an input device, or even more directly via interaction with the projected image. In the case of direct interaction, the user might interact with a virtual object within the virtual environment space, or with a physical object (e.g., a game piece, a game board, etc.) that is within the virtual environment space visually represented by the image. Thus, a user may interact with visualized representations of virtual environment space, enabling complex and interesting interactivity scenarios and applications.

Systems that project images that represent virtual environment spaces and virtual objects themselves, and that detect interaction with one or more of the virtual objects are also disclosed. Such a system, which may also be referred to herein as a "projection system," may be capable of modifying an image based on that interaction, and may be capable of projecting the modified image to display the result(s) of such interaction.

This summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be provided by reference to the accompanying drawings. Understanding that the drawings depict only sample embodiments and are not, therefore, to be considered to be limiting of the scope of any of the appended claims, the embodiments will be described and explained with additional specificity and detail through the use of the accompanying drawings in which:

DETAILED DESCRIPTION

The principles described herein relate to the projection of an image to an interactive environment. The image may be two-dimensional or it may be three-dimensional. The image may include one or more virtual objects that are spatially positioned within a virtual environment space. The image is projected to provide a visual representation of all or a portion of the virtual environment space, including a visual representation of one or more of the virtual objects. The interactive image projection system may then detect user interaction with the image and, thus, with the visual representation of the virtual environment space and, in response to any detected interaction, change the image, and perhaps cause a change (e.g., a temporary change, a permanent change, etc.) to a state of a program or an application corresponding to the image that has been projected (e.g., for which the image provides a graphical user interface (GUI), etc.).

Figure 1:
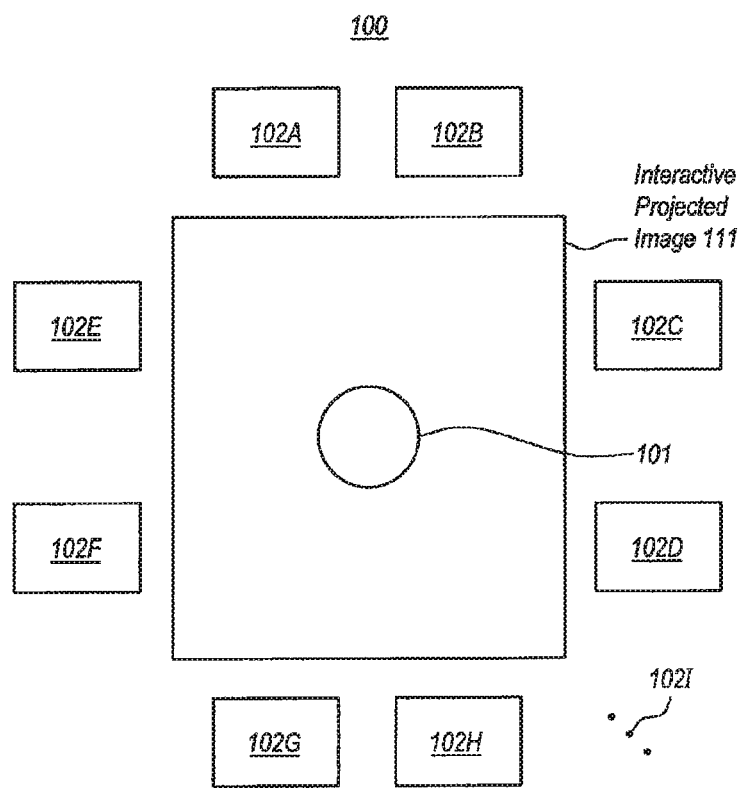
FIG. 1 abstractly illustrates an embodiment of a distributed system that includes an embodiment of an interactive projection system.

Although not required, the input mechanism may be especially useful in a distributed system 100, such as a distributed electronic game system. FIG. 1 abstractly illustrates a distributed system 100. The distributed system 100 includes an interactive image projection system 101. The interactive image projection system 101 projects an image 111. Through unique features of the distributed system 100 described hereinafter, a user may interact with the image 111 that has been projected.

In some embodiments, the image 111 may be projected onto a surface. The surface may be opaque or translucent (e.g., frosted glass, etc.).

The surface may be a substantially horizontal surface, in which case the image 111 may be projected, at least in part, downward onto the surface. As an example, the substantially horizontal surface may be a table top, a counter top, a floor, a game board, or any other surface that is oriented substantially horizontally. A "substantially horizontal" surface may be any surface that is within 30 degrees of horizontal. A "more precisely horizontal" surface may be any surface that is within 5 degrees of horizontal. Alternatively, the surface may be a substantially vertical surface. A "substantially vertical" surface may be any surface that is within 30 degrees of vertical. A "more precisely vertical" surface may be any surface that is within 5 degrees of vertical. As another alternative, the surface may be oriented orthogonally (i.e., at a non-parallel, non-perpendicular angle to the horizon).

In another embodiment, the image 111 may be projected onto a more complex surface. For instance, the surface onto which the image 111 is projected may include one or more substantially horizontal surfaces, one or more substantially vertical surfaces, and/or one/or more orthogonally oriented surfaces. As an example, the complex surface might include, as a substantially horizontal surface, all or part of a surface of a floor, a table, a game board, or the like, and, as a substantially vertical surface, all or part of a wall, a projection screen, a white board, or the like. Other examples of complex surface may include textured surfaces, curved surfaces, and surfaces with nonplanar topographies.

The image 111, as projected by the interactive image projection system 101, represents an interactive environment space in which one or more users may interact with the image 111 or features thereof (e.g., virtual objects, etc.). One or more users may interact with the image 111 manually, with physical objects, and/or with one or more input devices. The image 111 might be projected to a collaborative area, a work area, or any other type of interactive area. However, in the remainder of this description, the distributed system 100 is often described as being a game or as being used in conjunction with a game. In those cases, each user would be a player, and the interactive environment space to which the image 111 is projected would be an interactive play space. The principles described herein may apply to any environment in which one or more users interact with a projected image.

Since FIG. 1 is in abstract, the interactive image projection system 101 and the image 111 are only depicted as abstract representations. Subsequent figures will illustrate more specific embodiments of the interactive image projection system 101 and the image 111.

Optionally, the distributed system 100 may also include surrounding control devices, which are also referred to herein as "input devices." There are eight input devices 102A-H illustrated in FIG. 1, although the ellipses 1021 represent that a distributed system 100 may include fewer than eight input devices 102A-H or more than eight input devices 102A-H. The input devices 102A-H are represented abstractly as rectangles, although each will have a particular concrete form depending on its function and design. Example forms of input devices 102A-H are described in further detail below. In the context of a game, for example, the input devices 102A-H may be player consoles. However, the inclusion of one or more input devices 102A-H in a distributed system 100 is optional.

As an alternative to providing input through the input devices 102A-H, each user may instead provide input through direct, physical interaction with a three-dimensional space adjacent to a location to which the image 111 is projected. Such direct interaction may be provided for example, with a hand and one or more fingers, by manipulating physical objects (e.g., game pieces, etc.) positioned in relation to the image 111, or, perhaps, by rolling dice or playing cards in association with the image 111. The interactive image projection system 101 is capable of responding to multiple simultaneous instances of users interacting with a location to which the image 111 is projected. Thus, input into the distributed system 100 may be achieved using one or more input devices 102A-H and/or by direct interaction with the interactive environment image 111. Thus, a user may affect the state of the image and/or of a program or an application associated with the image (e.g., for which the image provides a GUI).

In one embodiment, one, some, or even all of the input devices 102A-H are wireless. In the case of a wireless input device 102A-H, the wireless input device 102A-H may communicate wirelessly with the interactive image projection system 101. One or even some of the input devices 102A-H may be located remotely from the image 111. Such remotely located game input device(s) 102A-H may communicate with the interactive image projection system 101 over a Wide Area Network (WAN), such as the Internet. That would enable a user to interact with the image 111 remotely, even if that user is not located in proximity to the image 111. Thus, for example, a father or mother stationed overseas might play a child's favorite board game with their child before going to bed. Or perhaps former strangers and new friends from different cultures around the globe might engage in a game, potentially fostering cross-cultural ties while having fun. That said, perhaps all of the game input devices 102A-H may be local (e.g., in the same room, etc.) to the interactive image projection system 101. In yet another embodiment, there are no input devices 102A-H. Regardless of whether there are input devices 102A-H or not, the user might directly interact with the image 111.

Figure 2:
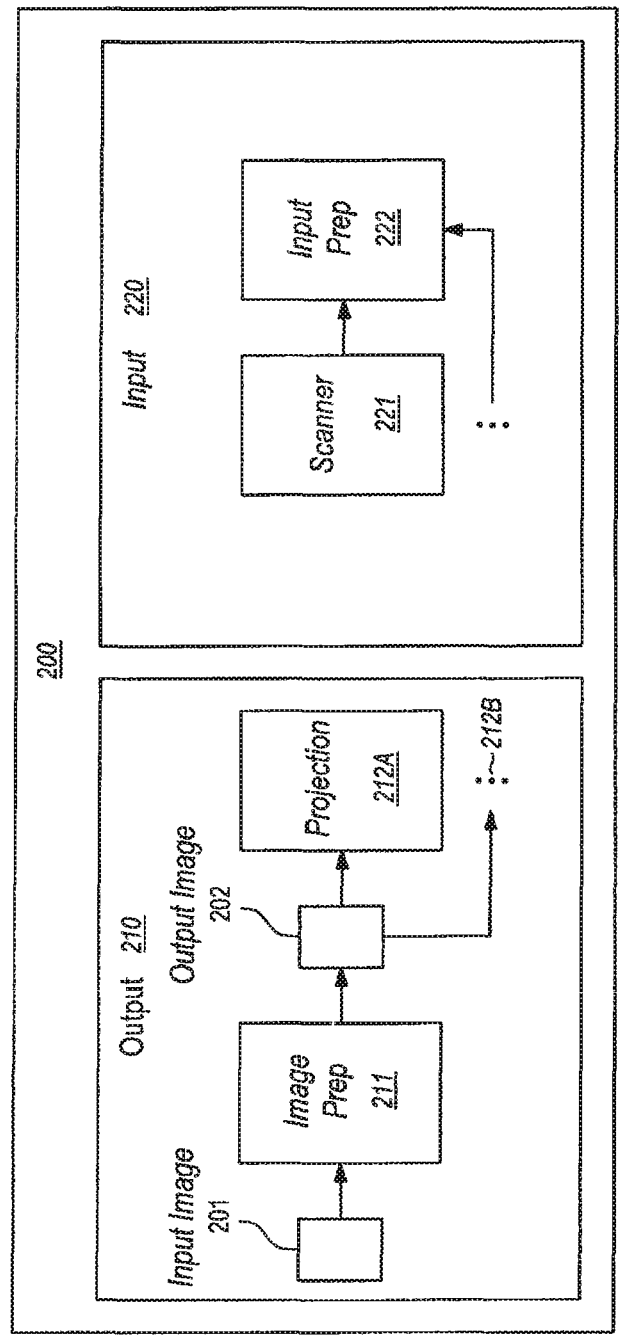
FIG. 2 abstractly illustrates an interactive image projection system that represents an embodiment of the interactive image projection system of FIG. 1.

FIG. 2 abstractly illustrates an interactive image projection system 200 that represents an embodiment of the interactive image projection system 101 of FIG. 1. The interactive image projection system 200 is illustrated as including an output channel 210 that projects an image (e.g., the image 111 of FIG. 1). The output channel 210 includes several functions including image preparation and projection. Image preparation is performed by an image preparation mechanism 211, and projection of the image 111 is performed by projector(s) 212A, 212B, etc., with one projector 212A being depicted and the ellipses 212B representing one or more optional additional projectors in the output channel 210 of the interactive image projection system 200.

The image preparation mechanism 211 receives an input image 201 and supplies an output image 202 in response to receiving the input image 201. The input image 201 may be provided by any image generator. As an example, the input image 201 might be provided by a video game console, a rendering program (whether two dimensional or three-dimensional), or any other module, component or software, that is capable of generating an image.

The input image 201 represents one or more virtual objects that are positioned in a virtual environment space. As an example, the virtual environment space may represent a battleground with specific terrain. The battleground is represented in a computer, and need not represent any actual battleground. Other examples of virtual environment space might include a three-dimensional representation of the surface of the Moon, a representation of a helium atom, a representation of a crater of a fictional planet, a representation of a fictional spacecraft, a representation of outer space, a representation of a fictional subterranean cave network, and so forth. Whether representing something real or imagined, the virtual environment space may be embodied by a computer program or an application.

Virtual objects may be placed in the virtual environment space by a computer program or an application, and may represent any object, real or imagined. For instance, a virtual object might represent a soldier, a tank, a building, a fictional anti-gravity machine, or any other possible object, real or imagined.

Figure 3:
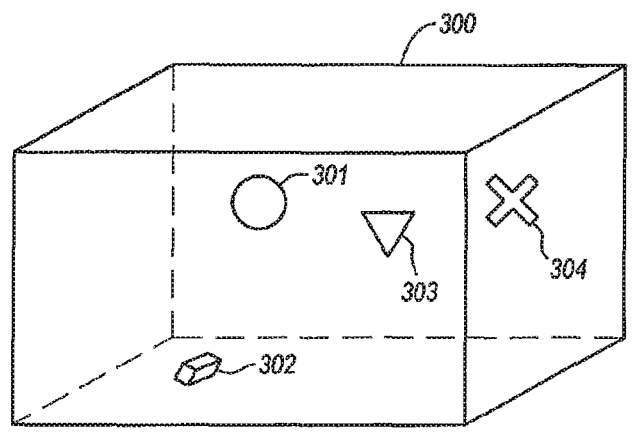
FIG. 3 illustrates an example embodiment of a virtual environment space that includes virtual objects.

FIG. 3 illustrates an example of a virtual environment space 300. In this example, the virtual environment space 300 includes virtual objects 301, 302, 303, and 304. In this case, the virtual environment space 300 is a three-dimensional space, such that the virtual objects 301, 302, 303, and 304 are represented as three-dimensional objects having specific shapes, positions, and/or orientations within the virtual environment space 300. This virtual environment space 300 may be used in order to formulate a representation of a certain portion and/or perspective of the virtual environment space 300. The output image 202, as projected, includes a visual representation of at least part of the virtual environment space 300, the visual representation includes a visual representation of at least one of the virtual objects 301, 302, 303, and 304. For instance, if the virtual environment space 300 comprises the inside of a virtual crater, the output image 202 may provide a visual representation of at least a portion of that crater, with virtual objects 301, 302, 303, and 304 that might include several crater monsters, soldiers that are members of the same team, weapons that are strewn about and ready to be picked up, and so forth. If the virtual environment space 300 were a city, the visual representation might be a portion of the city and include virtual objects 301, 302, 303, and 304 that comprise things like vehicles, buildings, people, and so forth.

The image preparation mechanism 211 may perform any processing on the input image 201 to generate the output image 202 that is ultimately projected by the one or more projectors 212A, 212B. As an example, the image preparation mechanism 211 may simply pass the input image 201 through, such that the output image 202 is identical to the input image 201. The image preparation mechanism 211 might also change the format of the input image 201, change the resolution of the input image 201, compress the input image 201, decrypt the input image 201, select only a portion of the input image 201, or the like. If multiple projectors 212A, 212B are used, the image preparation mechanism 211 may select which portion of the input image 201 (i.e., a "subimage") is to be projected by each projector 212A, 212B, such that when the output images 202 are projected by each projector 212A, 212B, the collective whole of all of the output images 202 may appear as a single image at the location to which the output images 202 are projected, a process referred to herein as "stitching."

The image preparation might also take into consideration appropriate adjustments given the surface on which the output image 202 is to be projected, or any intervening optics. For instance, if the output image 202 is to be projected onto a complex surface, the image preparation mechanism 211 may adjust the input image 201 such that the output image 202 will appear properly on the complex surface. The user might configure the image preparation mechanism 211 with information regarding the complex surface. Alternatively, or in addition, the interactive image projection system 200 may be capable of entering a discovery phase upon physical positioning that identifies the characteristics of any surface onto which an output image 202 is to be projected, in relation to the projector(s) 212A, 212B. As an example, if the surface includes a combination of horizontal, orthogonal, and/or vertical surfaces, the image preparation mechanism 211 may take into consideration the distances to the surfaces and the angles at which the surfaces are oriented to make sure that the output image 102 appears proportional and as intended on each surface. Thus, the image preparation mechanism 211 may make appropriate geometrical adjustments to the input image 201 so that the output image 202 appears properly on each surface. Other examples of complex surfaces include spherical surfaces, full and partial cylindrical surfaces, surfaces that include convex portions, surfaces that include concave portions, other curved surfaces, including surfaces with repeated curvatures or other complex curvatures, and surfaces that represent a nonplanar topography (as in a complex terrain with various peaks and valleys). In cases in which the output image 202 is to pass through optics such as lens and mirrors, the image preparation mechanism 211 may consider the presence of such optics and modify the input image 201 accordingly.

In addition to image preparation and projection, the interactive image projection system 200 may also output various signals. For instance, the interactive image projection system 200 may output audio, such as audio that corresponds to the input image 201. The interactive image projection system 200 may output wired or wireless signals to the input devices 102A-H, perhaps causing some private state to be altered at the input devices 102A-H. In addition, if there is a central display that displays an image (e.g., the interactive central display described in the co-pending commonly assigned application Ser. No. 12/411,289, etc.) (hereinafter referred to simply as the "central display"), the interactive image projection system 200 may dispatch information in a wired or wireless fashion to the central display.

User input may be provided through interaction with an input device (such as one of the input devices 102A-H of FIG. 1) and/or through direct interaction of a real object (such as a human finger, a game piece, a game board, a central display or the like) with a three-dimensional space adjacent to a location where the output image 202 is projected. If there is to be direct interaction to provide input, the interactive image projection system 200 may also include an input channel 220.

The input channel 220 may include a scanning mechanism 221 capable of scanning a three-dimensional space adjacent to a location where the output image 202 is projected to determine whether or not a user is interacting with a virtual object displayed by or as part of the output image 202 or with another object (e.g., a physical object, etc.) that that may be used in conjunction with the output image 202. More specifically, the scanning mechanism 221 may detect movement of a manipulating element (e.g., a physical object, such as finger, a thumb, a hand, an object held by a user, etc.) into and within the three-dimensional space adjacent to a location where the output image 202 is projected.

As an example, suppose that the output image 202 of FIG. 2 includes just two-dimensional information. In that case, the projector(s) 212A, 212B project(s) the frame of the output image 202 or each output image 202. Then, after that frame or output image 202 is projected, during a short period before the next frame or output image 202 is projected, the scanning mechanism may scan the area where the last frame or output image 202 was projected. This projection and scanning process is then repeated for the next frame output image 202, and for the subsequent frame or output image 202, and so on. Even though projection and scanning may not happen at the same time (with scanning happening between projection of sequential frames or an output image 202 or between projection of sequential output images 202), they happen at such a high frequency that the output image(s) 202 may seem(s) to have continuous motion. Furthermore, even though the frame or output image 202 may not always be present, the period of time that the frame or the output image 202 is not present may be so short, and occur at a frequency that it may provide a human observer with the illusion that the frame or output image 202 is always present. Thus, real objects may have the appearance of occupying the same space as the output image(s) 202. Alternatively, the scanning mechanism 221 may operate while an output image 202 or a frame thereof is projected and displayed.

As another example, the output image 202 of FIG. 2 may represent three-dimensional information. In that case, for each frame of the output image 202 or from each sequence of output images 202, the projector(s) 212A, 212B may project a left eye image intended for the left eye, and a right eye image intended for the right eye. When appropriate aids are present that allow the left eye of a human observer to receive the left eye image (but not the right eye image), and that allow the right eye of that same human observer to receive the right eye image (but not the left eye image), the output image 202 can be observed by the human mind as being truly three dimensional. Three-dimensional glasses are an appropriate aid for enabling this kind of eye-specific light channeling, but the principles of the present invention are not limited to the type of aid used to allow a human observer to conceptualize three-dimensional image information.

In one example, projection of the left eye image and projection of the right eye image are interlaced, with each being displayed at a frequency at which continuous motion is perceived by a human observer. Typically, an average human observer cannot distinguish discrete changes, but instead perceives continuous motion, between frames that are output at a frequency of at least 44 frames per second. Thus, a system that operates at 120 Hz, and which interlaces a left eye image and a right eye image, each at 60 Hz, will suffice to formulate the appearance of continuous three-dimensional motion. At periodic times, the scanning mechanism 221 may scan for any objects (e.g., manipulating elements, etc.) that move into and/or within a three-dimensional space adjacent to a location where the output image 202 is projected in a manner that may comprise interaction of such an object with the output image 202. In an interactive image projection system 200 that operates at a frequency of 120 Hz, for example, the scanning may also occur at a frequency of 120 Hz, at a frequency of 60 Hz, or at some other interval. That said, the principles described herein are not limited to any particular frame rate for projection and sampling rate for scanning.

The input channel 220 of the interactive image projection system 200 may also include an input preparation function provided by, for example, an input preparation mechanism 222. This input preparation mechanism 222 may take the input provided through the scanning process and provide it in another form recognizable by a system that generates an input image 201 (such as perhaps by a conventional video game system). For instance, the input preparation mechanism 222 may receive information from the scanning mechanism 221 that allows the input preparation mechanism 222 to recognize gestures and interaction with virtual objects that are displayed and that may be visualized by one or more users. The input preparation mechanism 222 might recognize the gesture, and correlate that gesture to particular input. The input preparation mechanism 222 may consider the surface configuration, as well as any optics (such as mirrors or lenses) that may intervene between the location(s) to which the output image(s) 202 is (are) projected and the scanning mechanism 221.

As an example, suppose that the output image 202 is of a game board, with virtual game pieces placed on the game board. The user might reach into the output image 202 to the location of a virtual game piece (e.g., by simulated touching since the virtual game piece cannot be touched or otherwise physically contacted), and "move" that virtual game piece from one location of the game board to another, thereby advancing the state of the game, perhaps permanently. In that case, the movement may occur over the course of dozens or even hundreds of frames or output images 202, which, from the user's perspective, occurs in a moment. The input preparation mechanism 222 recognizes that a physical object (e.g., a manipulation element, etc., such as a human finger) has reached into a three-dimensional space adjacent to a location to which the output image 202 is projected, and extended to or adjacent to the location where the virtual game piece appears. If the image were a three-dimensional image, the input preparation mechanism 222 could monitor the position of the physical object in three-dimensional space relative to a three-dimensional position of the virtual game piece. The virtual game piece may comprise a projected portion of the output image 202 and, thus, the user would not feel the virtual game piece, but the input preparation mechanism 222 may recognize that the user has indicated an intent to perform some action on or with the virtual game piece.

In subsequent frames or output images 202, the input preparation mechanism 222 may recognize slight incremental movement of the physical object, which may represent an intent to interact with the output image 202 or a feature of the output image 202 (e.g., to move a virtual game piece in the same direction and magnitude as the finger moved, to otherwise manipulate the output image 202, etc.) and, optionally, an intent to interact with the output image or a feature thereof in a particular manner. The input preparation mechanism 222 may issue commands to cause the image preparation mechanism 211 to modify the output image 202 (now an input image 201) in an appropriate manner (e.g., to cause the virtual game piece to move in the virtual environment space, etc.). The changes can be almost immediately observed in the next frame or in the next output image 202. This occurs for each frame or output image 202 until the user indicates an intent to no longer move the game piece (e.g., by tapping a surface on which the output image 202 is projected at the location at which the user wishes to deposit the virtual game piece, etc.).

The appearance to the player would be as though the player had literally contacted the virtual game piece and caused the virtual game piece to move, even though the virtual game piece is but a projection. Accordingly the interactive image projection system 200 may enable the projection and movement of virtual objects or otherwise enable the projection and manipulation of a virtual environment space. Other actions might include resizing, re-orienting, changing the form, or changing the appearance of one or more virtual objects with which a user interacts.

As a further example, the user may interact with physical objects associated with an image that has been projected. The input channel 220 may recognize the position, orientation, and/or configuration of the physical object and interpret user movements and/or gestures (e.g., movement or manipulation of a physical object, etc.) or interaction with virtual features associated with the physical object. For instance, in the MONOPOLY board game, a physical game board may be placed within a projected image that might include virtual objects, such as, virtual "Chance" and "Community Chest" cards, virtual houses and hotels, and perhaps a combination of real and virtual game pieces (according to player preference configured at the beginning of a game). A player might tap on a property owned by that player, which the input channel may interpret as an intent to build a house on the property. The input channel 220 might then coordinate with any external image generation system and the output channel 210 to cause an additional virtual house to appear on the property (with perhaps some animation). In addition, the input channel 220 may coordinate to debit the account of that player by the cost of a house. In addition, information may be transmitted to a personal input device 102A-H operated by the user to update an account balance displayed by the personal input device 102A-H.

As another example of the MONOPOLY board game, the player might roll actual dice at the beginning of the player's turn. The input channel 220 may recognize the numbers on the dice after they have been rolled and cause the projected image to highlight the position that the player's game piece should move to. If the player has a virtual game piece, then the system might automatically move (with perhaps some animation) the virtual game piece, or perhaps have the user move with the player's interaction with the virtual game piece (perhaps configured by the user to suit his/her preference). In response, the interactive image projection system 200 might transmit a prompt to the user's input device, requesting whether the user desires to purchase the property, or notifying the user of rent owed. In one embodiment, the output channel 210 not only projects images, but also responds to an external game system to provide appropriate output to appropriate devices. For instance, the output channel 210 might recognize that the external game system is providing the current player with an inquiry as to whether or not the current player wants to purchase the property. The output channel 210, in addition to projecting the appropriate image, may also transmit an appropriate prompt to the player's input device 102A-H.

In yet a further example, a central display may display an image and be positioned within an image that has been projected by the interactive image projection system 101. Thus, a projected image may be superimposed with an image displayed by the central display.

In some embodiments, the principles described herein may take a conventional system and allow for a unique interaction with a projected image. The interactive image projection system 200 may interface with a conventional image generation system (e.g., a graphic processor, etc.) to enable interaction with an image that has been projected. The interactive image projection system 200 may receive an image generated by the conventional image generation system, with the image preparation mechanism 211 conducting any processing of any interaction by a user with the projected image. The conventional image generation system may generate the image in the same manner as if the image were just to be displayed by a conventional display or projector. Once a user has interacted with a projected image and such interaction has been detected and processed by the image preparation mechanism 211, the conventional image generation system receives commands from the image preparation mechanism 211 as it is accustomed to receive commands from conventional input devices to effect a change in the game state of a program or an application for which a GUI has been displayed (i.e., projected) and advance use of the program or the application. The conventional image generation system may operate in the same manner it would normally function in response to conventional inputs, no matter how complex the systems used to generate the commands. Whether the input was generated by a conventional hand-held controller, or through the complexity of the input channel 220, the conventional image generation system will operate in its intended manner.

In addition to being capable of preparing input information for conventional image generation systems, the input channel 220 may provide information for other surrounding devices, such as, any of one or more conventional input devices, and perhaps a central display, associated with the conventional image generation system, thereby altering state of any of these devices, and allowing for these devices to participate in interacting with the program or the application whose outputs are being interactively projected.

Figure 4:
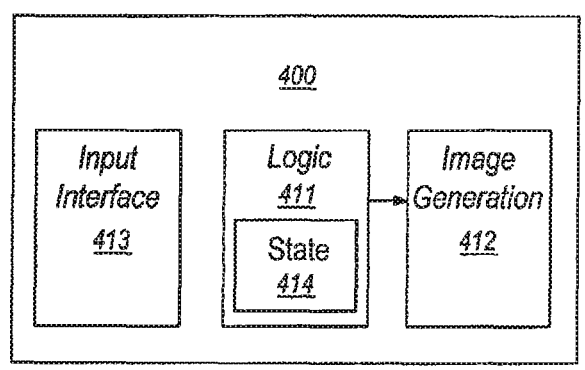
FIG. 4 abstractly illustrates an image generation system with which the interactive image projection system may operate.

FIG. 4 abstractly illustrates an image generation system 400, which may be used to generate the input image 201 of FIG. 2. In one embodiment, the image generation system 400 may be a conventional video game that outputs an image that might, for example, change as a player progresses through the video game. However, one, some, and perhaps even all of the functions described as being included within the image generation system 400 may be performed instead within the interactive image projection system 101.

Figure 11:
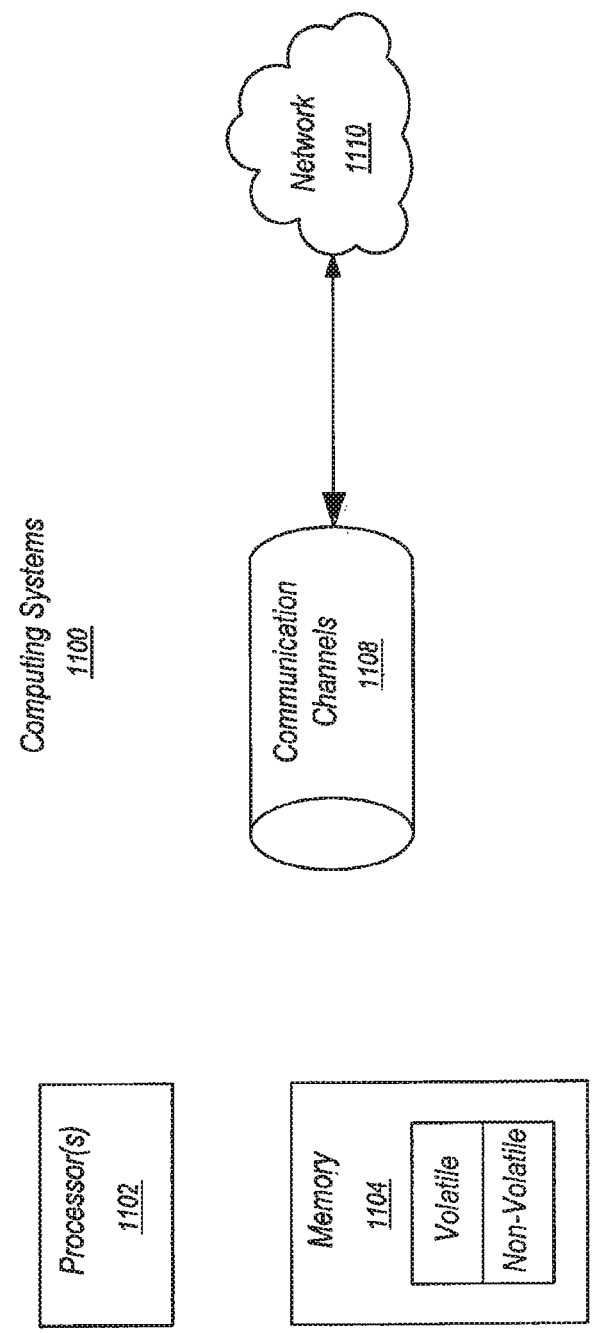
FIG. 11 illustrates a computing system architecture in which the principles described herein may be employed in at least some embodiments.

The image generation system 400 includes logic 411, an image generation mechanism 412, and an input interface 413. The logic 411 and/or the image generation mechanism 412 control a virtual environment space. The image generation mechanism 412 generates an image that is appropriate given a current state 414 of the logic 411 and, thus, of the virtual environment space. The input interface 413 receives commands that may alter the state 414 of virtual environment space and, thus, of the logic 411, thereby potentially affecting the image generated by the image generation mechanism 412. The state 414 may even be altered from one stage to the next as one or more users interact with a program or an application through the input interface 413. In such systems, images can be generated at such a rate that continuous motion is perceived. There may be a bi-directional channel of communication 1108 (FIG. 11) between the image generation system 400 and the interactive image projection system 200. The bi-directional channel may be wired or wireless, or perhaps wired in one direction and wireless in another. Input commands are typically less data-intensive as compared to images, and thus the channel of communication 1108 from the interactive image projection system 200 to the image generation system 400 may be wireless. The channel of communication 1108 from the image generation system 400 to the interactive image projection system 200 may also be wireless provided that the bandwidth of the channel in that direction is sufficient.

The interactive image projection system 101 and/or any associated input devices 102A-H may have built-in microphones to allow sound data (e.g., the player's voice, etc.) to be input into the image generation system 400 to affect the state 414. There may also be voice recognition capability incorporated into the interactive image projection system 101 and/or any associated input devices 102A-H to permit such sound data to be converted to more usable form. Speakers, headset ports, and earpieces may be incorporated into the interactive image projection system 101 and/or into any input devices 102A-H associated with the interactive image projection system 101.

Figure 5:
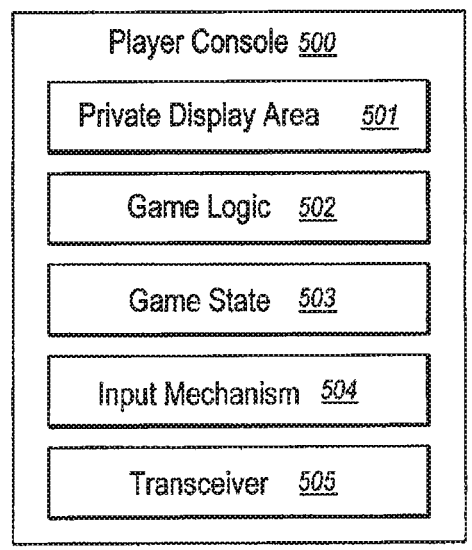
FIG. 5 abstractly illustrates an embodiment of an input device of the embodiment of distributed system of FIG. 1.

FIG. 5 abstractly illustrates an embodiment of a player console 500. As previously mentioned, the input devices 102A-H of FIG. 1 may be player consoles in the context in which the distributed system 100 is a game environment. FIG. 5 is an abstract illustration of a player console 500 showing functional components of the player console 500. Each player, or perhaps each team of players, may have an associated player console, each associated with the corresponding player or team. The player console 500 includes a private display area 501 and game logic 502 capable of rendering at least a portion a private portion of game state 503 associated with the player (or team). The player or team may use an input mechanism 504 to enter control input into the player console 500. A transmission mechanism illustrated in the form of a transceiver 505 transmits that control input to the interactive image projection system 200 of FIG. 2 and/or to the image generation system 400 of FIG. 4, where the control input is used to alter the state 414 of the logic 411 used to generate the image.

Figure 6:
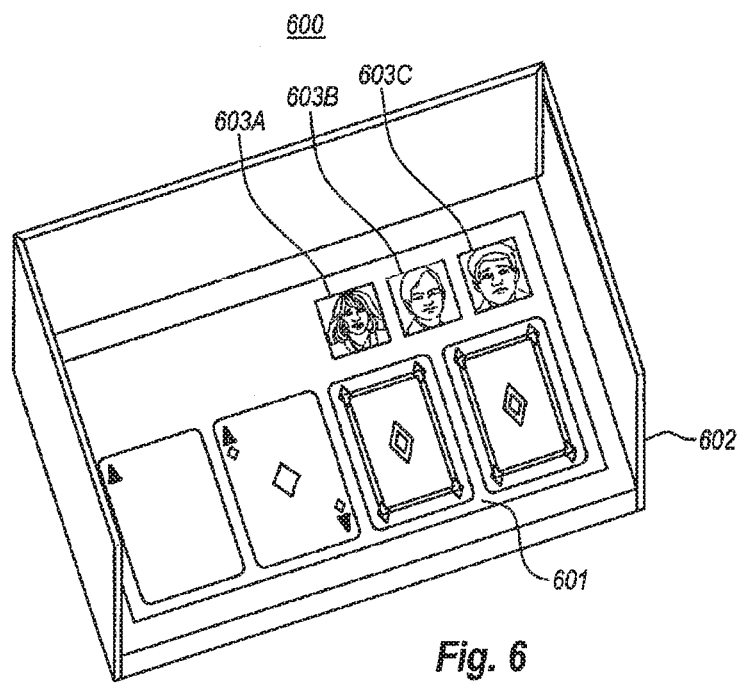
FIG. 6 illustrates a specific embodiment of an input device.

FIG. 6 illustrates a specific embodiment of a player console 600. Here, the private display area 601 displays the player's private information (in this case, several playing cards). The player console 600 also includes a barrier 602 to prevent other players from seeing the private game state displayed on the private display area 601. The private display area 601 may be touch-sensitive, allowing the player to interact with physical gestures on the private display area 601, thereby causing control information to update the rendering on the private display area 601, and the game states on the player console 600, as well as on the central display 101. The private display area 601 may also display video images 603A, 603B, and 603C of other players.

Figure 7:
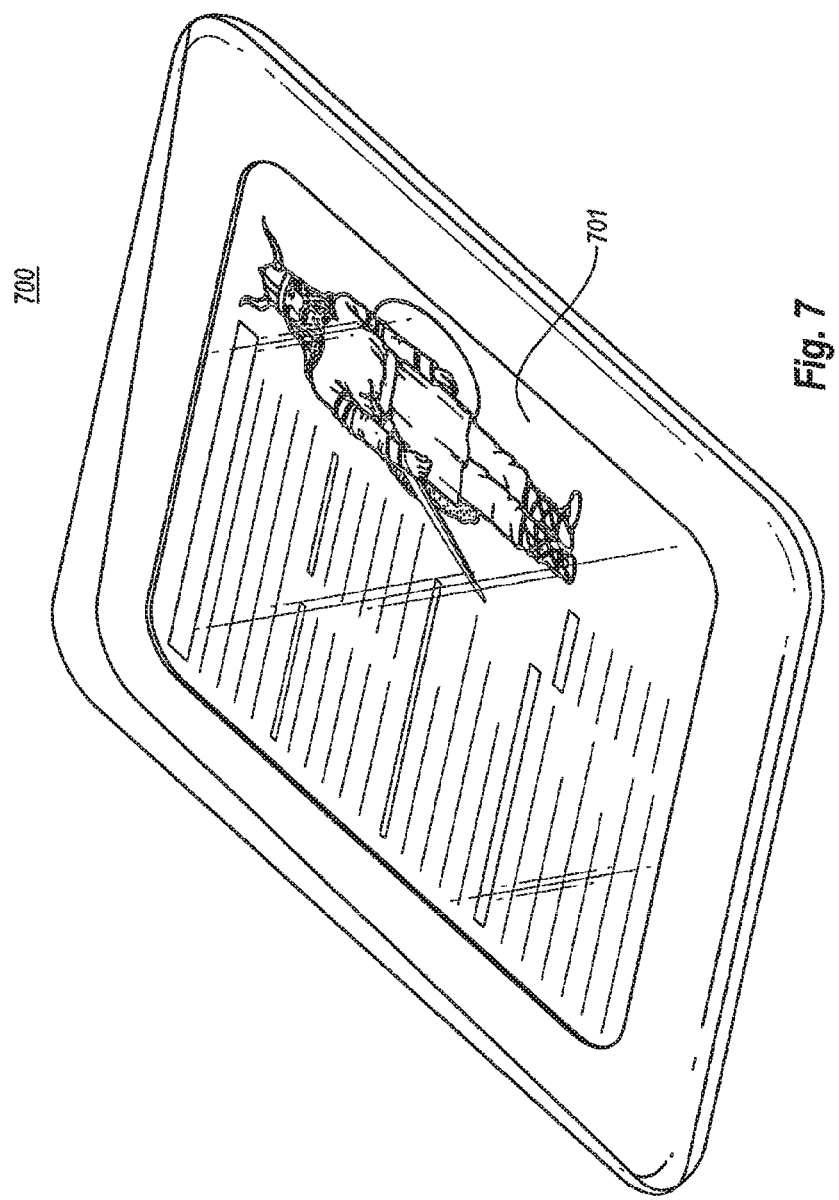
FIG. 7 illustrates another specific embodiment of an input device.

In one embodiment, at least one of the player consoles is different from the remaining player consoles 600. FIG. 7 illustrates such a player console, which might be a game master console 700, with which a game master may interface with the private viewing area to perhaps control game state. For instance, the game master may use physical gestures on a touch-sensitive display 701 of the game master console 700 to affect what is displayed within the image 111. For instance, the game master might control what portions of the map are viewable in the image 111. The game master might use the game master console 700 to control the effect of another player's actions on the operation of the game logic. The game master might also use the game master console 700 to create a scenario and to set up a game.

Figure 8:
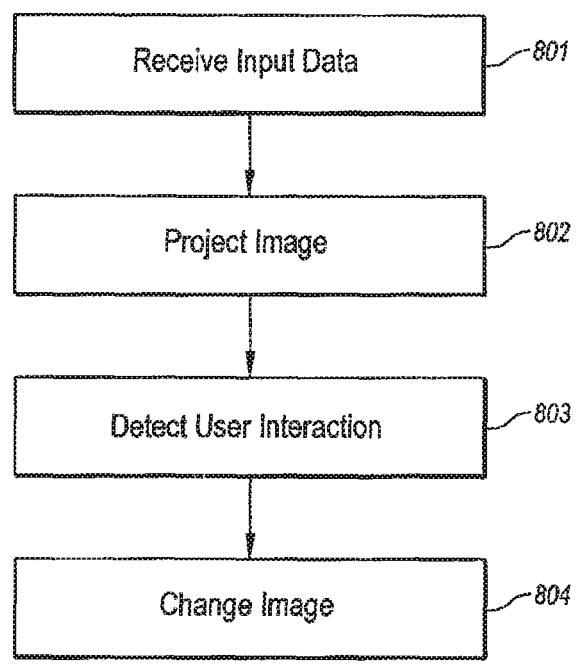
FIG. 8 is a flowchart of a method for projecting and detecting interaction with a projected image.

FIG. 8 is a flowchart of a method 800 for projecting an image and for enabling interaction with the image. At reference 801, data representing one or more virtual objects that are spatially positioned in a virtual environment space is received. An example of such data is an image in which such virtual objects are represented. The image is then projected at reference 802 in response to the received data. The image may provide a visual representation of at least part of the virtual environment space. At reference 803, any user interaction with the visualized represent provided by the image may be detected. In response to that user interaction, the projected image is then altered at reference 804.

Figure 9:
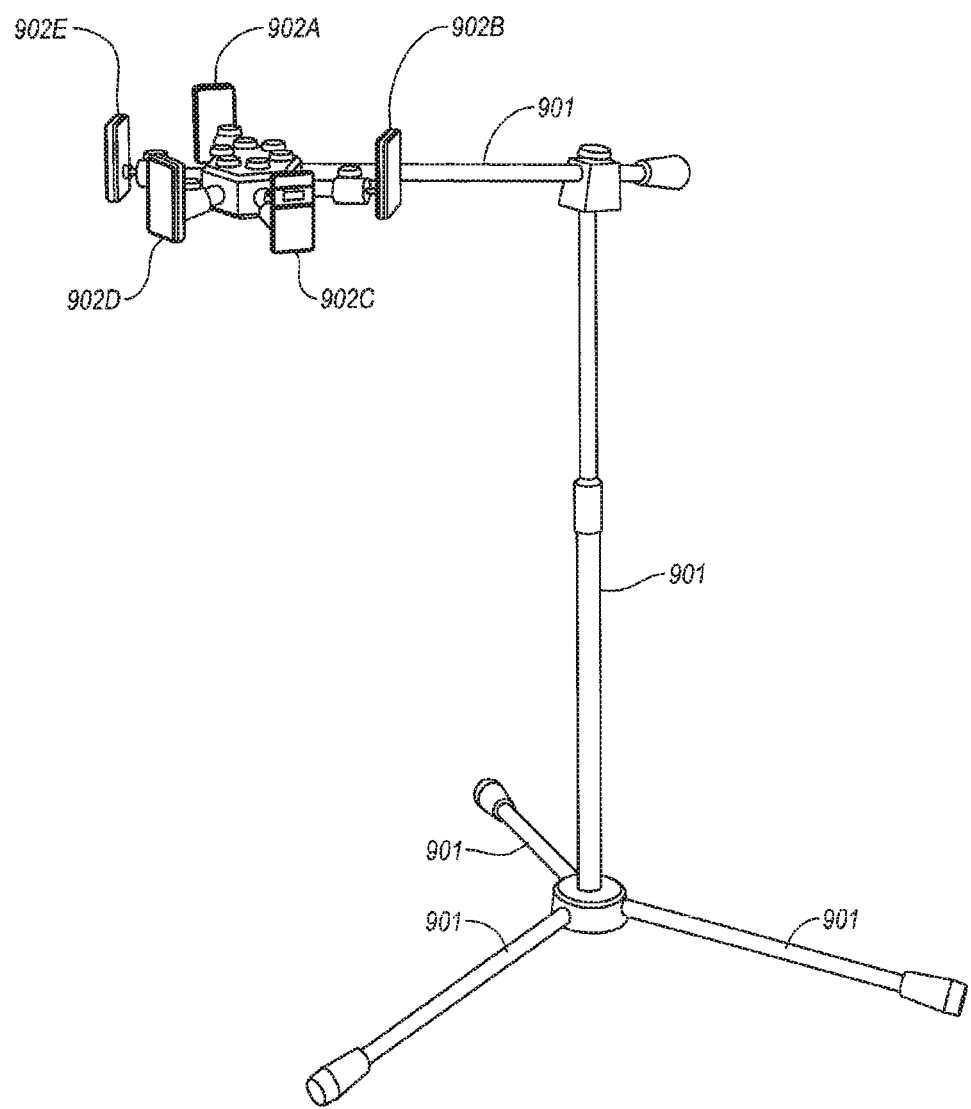
FIGS. 9 and 10 illustrate specific embodiments of interactive image projection systems.

FIG. 9 illustrates an embodiment of an interactive image projection system 900 in which multiple modules 902A through 902E are mounted to a stand 901. Each module 902A through 902E includes a projector and a corresponding camera (not shown) which would be in the lower surface of each module 902A through 902E. The projector projects the images downward towards a surface on which the stand 901 is situated. These projectors would each project a corresponding subimage that are each processed such that the projected image is stitched together to appear as a single image on or over the surface. The camera scans for user interaction in the area of the image that has been projected.

Figure 10:
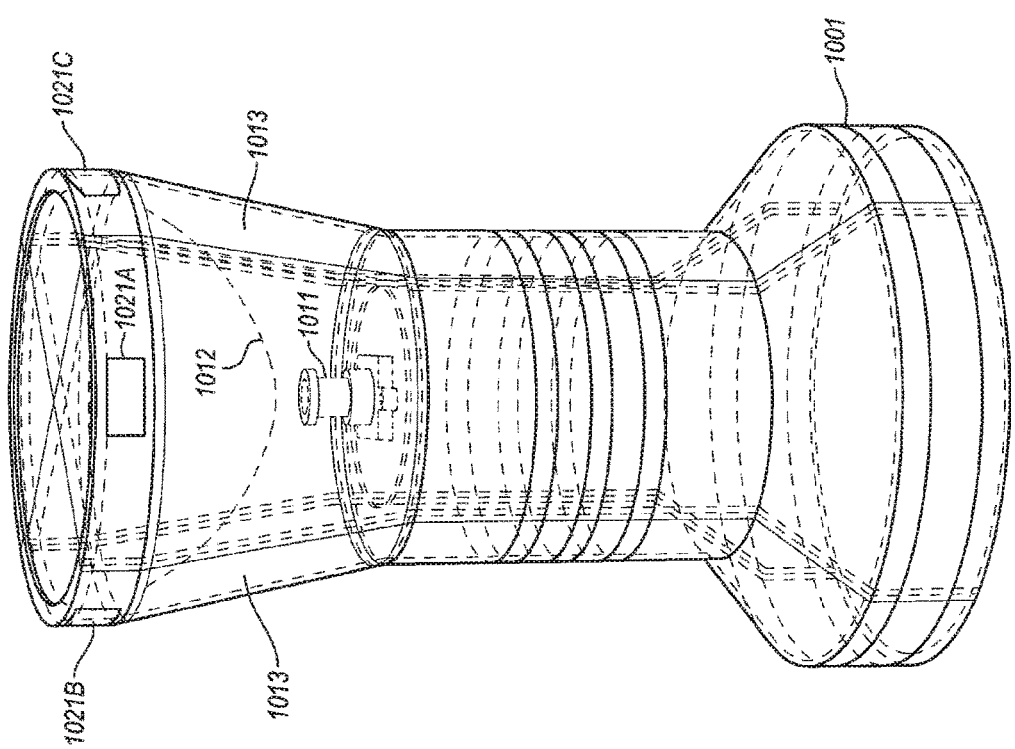

FIG. 10 illustrates another embodiment of an interactive image projection system 1000 that includes a single projector. The interactive image projection system 1000 includes a housing that includes a rigid base 1001 situated on a substantially horizontal surface. A projector 1011 is capable of projecting an image upward through a lens to a curved mirror 1012, from which the image is reflected and projected through windows 1013, and the projected downward onto the substantially horizontal surface on which the base 1001 is placed. The images are generated to account for the intervening lens(es), mirror(s) 1012, and window(s) 1013 used to project the image. Four cameras (of which three 1021A through 1021C are visible in FIG. 10) are positioned around the upper circumference of the interactive image projection system 1000. Such cameras 1021A through 1021C are capable of scanning a three-dimensional space adjacent to a location to which the image is projected to detect any interaction with the image.

The various operations and structures described herein may, but need not, be implemented by way of a physical computing system. Accordingly, to conclude this description, an embodiment of a computing system will be described with respect to FIG. 11. The computing system 1100 may be incorporated within the interactive image projection system 101, within one or more of the input devices 102A-H, and/or within the image generation system 400.

Computing systems are now increasingly taking a wide variety of forms. Computing systems may, for example, be handheld devices, appliances, laptop computers, desktop computers, mainframes, distributed computing systems, or even devices that have not conventionally been considered to be computing systems. In this description and in the claims, the term "computing system" is defined broadly as including any device or system (or combination thereof) that includes at least one processor and memory capable of having thereon computer-executable instructions that may be executed by the processor(s). The memory may take any physical form and may depend on the nature and form of the computing system. A computing system 1100 may communicate with other devices, including, but not limited to other computing systems, over a network environment 1110, which may include multiple computing systems. In some embodiments, components of a single computing system 1100 may be distributed over a network environment 1110.

In its most basic configuration, a computing system 1100 may include at least one processor 1102 and memory 1104. The memory 1104 may comprise a physical system memory, which may be volatile, non-volatile, or some combination of the two. The term "memory" may also be used herein to refer to non-volatile mass storage such as physical storage media. If components of the computing system 1100 are distributed over a network environment 1110, the processor 1102, memory 1104, and/or storage capability may be distributed as well. As used herein, the term "module" or "component" can refer to software objects or routines that execute on the computing system 1100. The different components, modules, engines, and services described herein may be implemented as objects or processes that execute on the computing system (e.g., as separate threads, etc.).

In the description above, embodiments are described with reference to acts that are performed by one or more computing systems 1100. If such acts are implemented in software, one or more processors of the associated computing system that performs the act direct the operation of the computing system 1100 in response to having executed computer-executable instructions. An example of such an operation involves the manipulation of data. The computer-executable instructions (and the manipulated data) may be stored in the memory 1104 of the computing system 1100.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other physical medium which can be used to carry or store desired program code means in the form of computer-executable instructions or data structures and which can be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

The components of the computing system 1100 may, for example, be used to provide functionality to game logic, store or remember game state, configure and communicate between devices, and operate the logic of game incorporation. Each of the player consoles may also have a computing system such as computing system 1100 guiding their processing needs.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for projecting an interactive environment image on at least one surface, the method comprising:
    projecting an environment image, the environment image comprising a visualized representation of at least part of a virtual environment space, the visualized representation including a visualized representation of a plurality of virtual objects; and
    detecting user interaction with at least one virtual object of the plurality of virtual objects of the visualized representation, including:
        scanning a three-dimensional space adjacent to or coincident with the visualized representation; and
        detecting interaction between a physical object and the at least one virtual object.

2. The method of claim 1, wherein detecting the user interaction comprises detecting a physical movement or manipulation of the physical object within the three-dimensional space.

3. The method of claim 1, wherein detecting user interaction further includes:
    detecting extension of a physical object into the three-dimensional space from a location outside of the three-dimensional space.

4. The method of claim 3, wherein detecting user interaction comprises distinguishing between a plurality of physical objects simultaneously extending into the three-dimensional space from locations outside of the three-dimensional space.

5. The method of claim 1, further comprising:
    changing the visualized representation in response to interaction between the physical object and the at least one virtual object.

6. The method of claim 5, wherein changing the visualized representation comprises affecting the at least one virtual object with which the physical object has interacted.

7. The method of claim 6, wherein affecting the at least one virtual object comprises moving, manipulating, or changing the at least one virtual object.

8. The method of claim 5, wherein changing the visualized representation comprises adding a new visualized object to the visualized representation.

9. The method of claim 1, wherein projecting the environment image includes projecting at least a portion of the environment image on a surface.

10. The method of claim 9, wherein projecting the environment image includes projecting portions of the environment image on differently oriented surfaces.

11. The method of claim 9, wherein projecting the environment image comprises projecting a prepared image tailored to a topography of the surface to ensure that features of the environment image are proportionately displayed on the surface.

12. The method of claim 9, wherein detecting user interaction includes detecting user interaction with a topography of the surface.

13. The method of claim 1, wherein the environment image includes three-dimensional information viewable by a user as a three-dimensional image.

14. The method of claim 1, wherein projecting the environment image comprises projecting a plurality of sub-images from a plurality of discrete locations, the method further comprising:
    formulating data representing the plurality of sub-images prior to projecting the plurality of sub-images.

15. A computing system, comprising:
    a projection element capable of projecting an environment image; and
    a scanning mechanism capable of detecting a user interaction with an environment image, the environment image including a visual representation of at least part of a virtual environment space in which a plurality of virtual objects are spatially positioned, the act of detecting including:

scanning a three-dimensional space adjacent to or coincident with the visual representation; and detecting interaction between a physical object and a spatial position of at least one virtual object of the plurality of virtual objects.

16. The computing system of claim 15, wherein the scanning mechanism is also capable of detecting a user interaction with the environment image by:

detecting extension of the physical object into the three-dimensional space from a location outside of the three-dimensional space.

17. The computing system of claim 15, further comprising:

at least one processing element programmed to change the visual representation in response to the user interaction with the visual representation.

18. The computing system of claim 17, wherein the scanning mechanism comprises the at least one processing element and at least one camera.

19. A portable projection system, comprising:

at least one projector capable of projecting an environment image representing a plurality of virtual objects that are spatially positioned in a virtual environment space; and a scanning mechanism capable of scanning an area adjacent to or coincident with the environment image to determine one or more spatial locations of interactivity, the scanning mechanism capable of:

scanning a three-dimensional space adjacent to or coincident with the environment image; and detecting interaction between a physical object and at least one spatial location within the three-dimensional space that corresponds to a location of at least one virtual object of the plurality of virtual objects.

20. The portable projection system of claim 19, wherein the scanning mechanism is also capable of:

detecting extension of the physical object into the three-dimensional space from a location outside of the three-dimensional space.

* * * * *